United States Patent
Zhu et al.

(10) Patent No.: US 12,394,445 B2
(45) Date of Patent: Aug. 19, 2025

(54) GENERATING REPRESENTATIONS OF EDITING COMPONENTS USING A MACHINE LEARNING MODEL

(71) Applicants: Lemon Inc., Grand Cayman (KY); Beijing Zitiao Network Technology Co., Ltd., Beijing (CN)

(72) Inventors: Sijie Zhu, Los Angeles, CA (US); Xin Gu, Beijing (CN); Fan Chen, Los Angeles, CA (US); Longyin Wen, Los Angeles, CA (US); Yufei Wang, Los Angeles, CA (US)

(73) Assignees: Lemon Inc., Grand Cayman (KY); Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/411,880

(22) Filed: Jan. 12, 2024

(65) Prior Publication Data

US 2025/0232793 A1 Jul. 17, 2025

(51) Int. Cl.
*G11B 27/031* (2006.01)
*G06V 10/82* (2022.01)

(52) U.S. Cl.
CPC ............ *G11B 27/031* (2013.01); *G06V 10/82* (2022.01)

(58) Field of Classification Search
CPC .............................. G11B 27/031; G06V 10/82
See application file for complete search history.

(56) References Cited

U.S. PATENT DOCUMENTS

| | | | |
|---|---|---|---|
| 11,829,406 B1 | 11/2023 | Meir Lador et al. | |
| 12,142,298 B1* | 11/2024 | Kottur | G06F 40/35 |
| 2021/0357307 A1 | 11/2021 | Deng et al. | |
| 2023/0042221 A1 | 2/2023 | Xu et al. | |
| 2024/0134936 A1* | 4/2024 | Fu | G06F 40/284 |
| 2024/0135098 A1* | 4/2024 | Simard | G06F 16/951 |

(Continued)

FOREIGN PATENT DOCUMENTS

| | | |
|---|---|---|
| CA | 3145124 A1 | 6/2023 |
| CN | 117274450 A | 12/2023 |

OTHER PUBLICATIONS

"Free all-in-one video editor for everyone to create anything anywhere"; https://www.capcut.com/; CapCut; accessed Jun. 11, 2024; 8 pages.

(Continued)

*Primary Examiner* — Gelek W Topgyal
(74) *Attorney, Agent, or Firm* — BakerHostetler

(57) ABSTRACT

The present disclosure describes techniques for generating representations of editing components using a machine learning model. Images and guidance tokens are input into a first sub-model of the machine learning model. The machine learning model is trained to distinguish the editing components from raw materials and generate the representations of the editing components. Tokens corresponding to the images are generated by the first sub-model based on the images and the guidance tokens. The tokens corresponding to the images and the guidance tokens are input into a second sub-model of the machine learning model. The second sub-model comprises a cross-attention mechanism. An embedding indicative of at least one editing component is generated based on the tokens corresponding to the images and the guidance tokens by the second sub-model.

20 Claims, 15 Drawing Sheets

(56) References Cited

U.S. PATENT DOCUMENTS

| | | | | |
|---|---|---|---|---|
| 2024/0203119 | A1* | 6/2024 | Ma | G06V 20/70 |
| 2024/0314406 | A1* | 9/2024 | Meier | H04N 21/23418 |
| 2024/0355022 | A1* | 10/2024 | Shi | G06T 7/194 |
| 2024/0404013 | A1* | 12/2024 | Zhou | G06T 9/00 |
| 2024/0412726 | A1* | 12/2024 | Delmas | G06F 40/30 |
| 2025/0005825 | A1* | 1/2025 | Zhang | G06V 20/70 |
| 2025/0078546 | A1* | 3/2025 | Zhang | G06V 10/82 |

OTHER PUBLICATIONS

Arnab et al.; "ViViT: A Video Vision Transformer"; IEEE/CVF Int'l Conf. on Computer Vision; 2021; p. 6836-6846.

Carion et al.; "End-to-End Object Detection with Transformers"; European Conf. on Computer Vision; 2020; p. 213-229.

Ceylan et al.; "Pix2Video: Video Editing using Image Diffusion"; IEEE/CVF Int'l Conf. on Computer Vision; 2023; p. 23206-23217.

Chen et al.; "Exploring Simple Siamese Representation Learning"; IEEE/CVF Conf. on Computer Vision and Pattern Recognition; 2021; p. 15750-15758.

Deng et al.; "ImageNet: A large-scale hierarchical image database"; IEEE Conf. on Computer Vision and Pattern Recognition; 2009; p. 248-255.

Devlin et al.; "BERT: Pre-training of Deep Bidirectional Transformers for Language Understanding"; Computer and Language; arXiv:1810.04805; May 2019; 16 pages.

Dosovitskiy et al.; "An Image is Worth 16x16 Words: Transformers for Image Recognition at Scale"; ICLR; arXiv:2010.11929; Jun. 2021; 22 pages.

Feichtenhofer et al.; "SlowFast Networks for Video Recognition"; IEEE/CVF Int'l Conf. on Computer Vision; 2019; p. 6202-6211.

Feichtenhofer et al.; "A Large-Scale Study on Unsupervised Spatiotemporal Representation Learning"; IEEE/CVF Conf. on Computer Vision and Pattern Recognition; 2021; p. 3299-3309.

Frey et al.; "Automatic Non-Linear Video Editing Transfer"; Computer Vision and Pattern Recognition; arXiv:2105.06988; May 2021; 5 pages.

Goodfellow et al.; "Generative Adversarial Networks"; Communications of the ACM; vol. 63; Nov. 2020; p. 139-144.

He et al.; "Momentum Contrast for Unsupervised Visual Representation Learning"; IEEE/CVF Conf. on Computer Vision and Pattern Recognition; 2020; p. 9729-9738.

He et al.; "Masked Autoencoders Are Scalable Vision Learners"; IEEE/CVF Conf. on Computer Vision and Pattern Recognition; 2022; p. 16000-16009.

Ho et al.; "Denoising Diffusion Probabilistic Models"; $34^{th}$ Conf. on Neural Information Processing Systems; 2020; 12 pages.

Kay et al.; "The Kinetics Human Action Video Dataset"; Computer Vision and Pattern Recognition; arXiv:1705.06950; May 2017; 22 pages.

Kingma et al.; "Adam: A Method for Stochastic Optimization"; ICLR; 2015; 15 pages.

Koorathota et al.; "Editing Like Humans: A Contextual, Multimodal Framework for Automated Video Editing"; IEEE/CVF Conf. on Computer Vision and Pattern Recognition; 2021; p. 1701-1709.

Liew et al; "MagicEdit: High-Fidelity and Temporally Coherent Video Editing"; Computer Vision and Pattern Recognition; arXiv:2308.14749; Aug. 2023; 8 pages.

Loshchilov et al.; "SGDR: Stochastic Gradient Descent with Warm Restarts"; ICLR; 2017; 16 pages.

Oord et al.; "Representation Learning with Contrastive Predictive Coding"; Machine Learning; arXiv:1807.03748; Jan. 2019; 13 pages.

Pan et al.; "VideoMoCo: Contrastive Video Representation Learning With Temporally Adversarial Examples"; IEEE/CVF Conf. on Computer Vision and Pattern Recognition; 2021; p. 11205-11214.

Paszke et al.; "PyTorch: An Imperative Style, High-Performance Deep Learning Library"; $33^{rd}$ Conf. on Neural Information Processing Systems; 2019; 12 pages.

Radford et al.; "Learning Transferable Visual Models From Natural Language Supervision"; $38^{th}$ Int'l Conf. on Machine Learning; Feb. 2021; 48 pages.

Rombach et al.; "High-Resolution Image Synthesis With Latent Diffusion Models"; IEEE/CVF Conf. on Computer Vision and Pattern Recognition; 2022; p. 10684-10695.

Shang et al.; "Video Visual Relation Detection"; $25^{th}$ ACM Int'l Conf. on Multimedia; 2017; p. 1300-1308.

Shen et al.; "AutoTransition: Learning to Recommend Video Transition Effects"; ECCV; arXiv:2207.13479; Jul. 2022; 22 pages.

Tong et al.; "VideoMAE: Masked Autoencoders are Data-Efficient Learners for Self-Supervised Video Pre-Training"; $36^{th}$ Conf. on Neural Information Processing Systems; 2022; 16 pages.

Tran et al.; "Video Classification With Channel-Separated Convolutional Networks"; IEEE/CVF Int'l Conf. on Computer Vision; 2019; p. 5552-5561.

Van der Maaten et al.; "Visualizing Data using t-SNE"; Journal of Machine Learning Research; vol. 9; 2008; p. 2579-2605.

Vaswani et al.; "Attention is All you Need"; $31^{st}$ Conf. on Neural Information Processing Systems; 2017; 11 pages.

Wang et al.; "VideoMAE V2: Scaling Video Masked Autoencoders With Dual Masking"; IEEE/CVF Conf. on Computer Vision and Pattern Recognition; 2023; p. 14549-14560.

Wei et al.; "Masked Feature Prediction for Self-Supervised Visual Pre-Training"; IEEE/CVF Conf. on Computer Vision and Pattern Recognition; 2022; p. 14668-14678.

Wu et al.; "Sampling Matters in Deep Embedding Learning"; IEEE Int'l Conf. on Computer Vision; 2017; p. 2840-2848.

Yang et al.; "Rerender A Video: Zero-Shot Text-Guided Video-to-Video Translation"; SIGGRAPH Asia Conf. Papers; arXiv:2306.07954; Sep. 2023; 13 pages.

Zhang et al.; "Deep Image Compositing"; IEEE/CVF Winter Conf. on Applications of Computer Vision; 2021; p. 365-374.

International Patent Application No. PCT/CN2024/140349; Int'l Search Report; dated Mar. 13, 2025; 3 pages.

* cited by examiner

| | Video Effect | Animation | Transition | Filter | Sticker | Text | Total |
|---|---|---|---|---|---|---|---|
| Editing Components | 888 | 176 | 204 | 228 | 1000 | 598 | 3,094 |
| Material Pairs | 200 | 200 | 200 | 200 | 200 | 200 | 200 |
| Rendered Videos | 177,600 | 35,200 | 40,800 | 45,600 | 200,000 | 119,600 | 618,800 |

```
┌─────────────────────────────────────────────────────────────┐
│ Generate a dataset of editing components, wherein each       │
│ video in the dataset is rendered by applying each single     │
│ editing component on both image materials and video          │
│ materials, and wherein the dataset of editing components     │
│ enables to learn universal representations of different      │
│ editing components 502                                       │
└─────────────────────────────────────────────────────────────┘
                              │
                              ▼
┌─────────────────────────────────────────────────────────────┐
│ Train a machine learning model on at least a subset of the  │
│ dataset of editing components, wherein the machine learning │
│ model is trained to distinguish editing components from raw │
│ materials and generate representations of the editing        │
│ components 504                                               │
└─────────────────────────────────────────────────────────────┘
                              │
                              ▼
┌─────────────────────────────────────────────────────────────┐
│ Guide a process of training the machine learning model by a │
│ contrastive learning loss, wherein the contrastive learning │
│ loss is applied to pull positive samples closer while        │
│ pushing negative samples away in embedding space 506         │
└─────────────────────────────────────────────────────────────┘
```

```
┌─────────────────────────────────────────────────────────────────┐
│ Adopt guidance tokens as key-value tokens of a first transformer block of a │
│ second sub-model, wherein the second sub-model comprises a cross-attention │
│                        mechanism 702                            │
└─────────────────────────────────────────────────────────────────┘
                                  │
                                  ▼
┌─────────────────────────────────────────────────────────────────┐
│ Extract prior knowledge of editing component embedding by feeding a query │
│            token to the first transformer block 704             │
└─────────────────────────────────────────────────────────────────┘
                                  │
                                  ▼
┌─────────────────────────────────────────────────────────────────┐
│ Feed a token output from the first transformer block and tokens corresponding │
│ to the images output from a first sub-model into a second transformer block, │
│ wherein the second sub-model comprises a plurality of layers of the first and │
│                    second transformer blocks 706                │
└─────────────────────────────────────────────────────────────────┘
                                  │
                                  ▼
┌─────────────────────────────────────────────────────────────────┐
│ Generate an embedding indicative of at least one editing component by the │
│  plurality of layers of the first and second transformer blocks 708 │
└─────────────────────────────────────────────────────────────────┘
```

FIG. 7

| Dataset | Duration (h) | Avg.Dur. (s) | Background | Classes | Videos |
|---|---|---|---|---|---|
| *Action Recognition* | | | | | |
| HMDB-51 | - | 6.5 | Dynamic | 51 | 3,312 |
| UCF-101 | 26.67 | 7.2 | Dynamic | 101 | 2,500 |
| ActivityNet-1.3 | 700.00 | 180 | Dynamic | 200 | 19,994 |
| Charades | - | 30 | Dynamic | 157 | 10,000 |
| Kinetics-400 | 657.00 | 10 | Dynamic | 400 | 306,245 |
| *Editing Component* | | | | | |
| AutoTransition | 153.61 | 15.8 | Dynamic | 104 | 34,998 |
| Ours | 687.56 | 4 | Dynamic & Static | 3094 | 618,800 |

FIG. 10

|  | Video Effect | | Animation | | Transition | | Filter | | Sticker | | Texts | | Avg. | |
| --- | --- | --- | --- | --- | --- | --- | --- | --- | --- | --- | --- | --- | --- | --- |
|  | R@1 | R@10 | R@1 | R@10 | R@1 | R@10 | R@1 | R@10 | R@1 | R@10 | R@1 | R@10 | R@1 | R@10 |
| VideoMoCo [22] | 4.1 | 9.2 | 5.0 | 9.9 | 2.6 | 6.9 | 1.3 | 7.9 | 0.7 | 4.8 | 1.1 | 2.7 | 2.5 | 6.9 |
| VideoMAE [23] | 10.4 | 16.1 | 21.6 | 29.1 | 15.0 | 23.8 | 4.9 | 6.2 | 5.2 | 5.3 | 6.8 | 6.8 | 10.7 | 14.3 |
| Ours (Baseline) | 33.5 | 71.5 | 22.4 | 68.4 | 30.0 | 76.2 | 15.6 | 40.6 | 56.6 | 93.9 | 28.8 | 85.4 | 31.2 | 72.7 |
| Ours | 55.3 | 80.6 | 51.6 | 81.8 | 54.6 | 85.3 | 22.5 | 48.0 | 85.8 | 98.2 | 46.0 | 89.7 | 52.6 | 80.6 |

FIG. 11

|                | Closed-set |       | Open-set |       |
| -------------- | ---------- | ----- | -------- | ----- |
|                | R@1        | R@10  | R@1      | R@10  |
| Classification | 42.00      | 77.18 | 39.03    | 80.73 |
| Ours           | 52.62  | 80.58 | 63.01 | 83.20 |

FIG. 12

| Ablations | Video Effect | | Animation | | Transition | | Filter | | Sticker | | Texts | | Avg. | |
|---|---|---|---|---|---|---|---|---|---|---|---|---|---|---|
| | R@1 | R@10 | R@1 | R@10 | R@1 | R@10 | R@1 | R@10 | R@1 | R@10 | R@1 | R@10 | R@1 | R@10 |
| Baseline | 33.5 | 71.5 | 22.4 | 68.4 | 30.0 | 76.2 | 15.6 | 40.6 | 56.6 | 93.9 | 28.8 | 85.4 | 31.2 | 72.7 |
| Baseline + $\mathcal{L}_{pqueue}$ | 40.3 | 76.4 | 32.7 | 69.2 | 30.9 | 72.9 | 20.8 | 39.8 | 58.8 | 94.6 | 36.1 | 90.2 | 36.6 | 73.8 |
| Baseline + $\mathcal{L}_{queue}$ + Guided Encoder | 43.2 | 75.9 | 37.4 | 70.9 | 39.2 | 76.4 | 20.8 | 44.3 | 58.1 | 95.1 | 41.5 | 92.4 | 40.0 | 75.8 |
| Baseline + $\mathcal{L}_{queue}$ + Guided Decoder | 51.0 | 78.6 | 41.0 | 82.0 | 49.8 | 87.5 | 21.0 | 44.9 | 79.2 | 97.7 | 52.1 | 90.3 | 49.0 | 80.2 |
| Baseline + $\mathcal{L}_{queue}$ + GE + GD | 55.3 | 80.6 | 51.6 | 81.8 | 54.6 | 85.3 | 22.5 | 48.0 | 85.8 | 98.2 | 46.0 | 89.7 | 52.6 | 80.6 |

| Raw Video | BS | R@1 | R@10 |
|---|---|---|---|
| ✓ | 6 | 49.0 | 79.4 |
| ✗ | 6 | 48.9 | 75.6 |
| ✗ | 8 | 52.6 | 80.6 |

| | V. E. | Anim. | Tran. | Filt. | Stic. | Text | Avg. |
|---|---|---|---|---|---|---|---|
| Random | 0.9 | 0.9 | 1.6 | 0.9 | 0.8 | 1.3 | 1.1 |
| Classification | 45.7 | 49.1 | 69.5 | 37.5 | 40.1 | 52.3 | 49.0 |
| Ours (Baseline) | 37.4 | 59.4 | 67.9 | 39.7 | 37.6 | 43.2 | 47.5 |
| Ours | 61.3 | 67.9 | 67.1 | 46.6 | 62.4 | 63.9 | 61.5 |

| Embedding | R@1 | R@5 | Mean Rank (↓) |
|---|---|---|---|
| Random [27] | 25.67 | 66.30 | 5.65 |
| AutoTransition[27] | 28.06 | 66.85 | 5.48 |
| Ours | 29.24 | 67.32 | 4.56 |

FIG. 14c

GENERATING REPRESENTATIONS OF EDITING COMPONENTS USING A MACHINE LEARNING MODEL

BACKGROUND

Video has emerged as a major modality of data across various applications, including social media, education, and entertainment. The predominant pipeline for video creation is based on various editing components. Techniques for learning universal representations for editing components are desired.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 3 shows example statistical information for a dataset of editing components in accordance with the present disclosure.

FIG. 5 shows an example process for generating a dataset of editing components and training a machine learning model in accordance with the present disclosure.

FIG. 7 shows an example process performed by a second sub-model of a machine learning model in accordance with the present disclosure.

FIG. 10 shows an example comparison of datasets in accordance with the present disclosure.

FIG. 11 shows a table illustrating the performance of six types of editing components in accordance with the present disclosure.

FIG. 12 shows outperformance of the techniques in accordance with the present disclosure.

FIG. 13 shows the results of the ablation studies performed in accordance with the present disclosure.

FIGS. 14A, 14B, 14C show outperformance of the techniques in accordance with the present disclosure.

DETAILED DESCRIPTION OF ILLUSTRATIVE EMBODIMENTS

Figure 1:
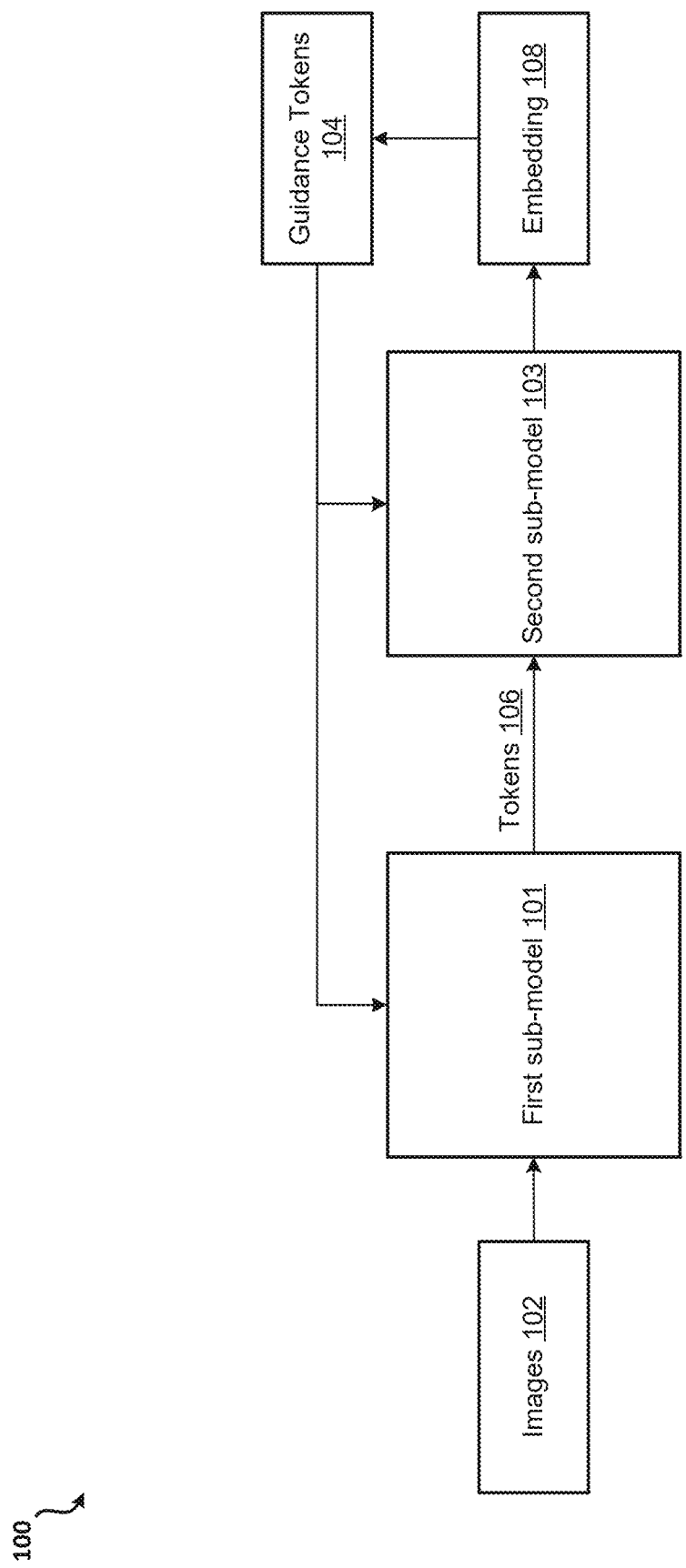
FIG. 1 shows an example system for generating representations of editing components using a machine learning model in accordance with the present disclosure.

Many videos are created using editing components every day on various video creation platforms. Such editing components may include, for example, video effects, animation, transitions, filters, stickers, text, etc. But little effort has been made to understand these editing components. Specifically, learning universal representations for editing components is unexplored, but critical, for many downstream video creation tasks, such as video effect recommendation, detection, recognition, generation, etc.

Existing video representation learning methods are often developed using object-centric action recognition datasets to encode information (e.g., semantics, action of the subjective, context, motion, etc.) from the video content. However, editing components often do not have clear semantics, subjective action, or context information. For example, an editing component may be a simple chroma change of the whole image, or a local effect like scattering stars. Some editing components may include special homography transformations on the raw material (e.g., image and/or video) and the rendered result may be highly dependent on the appearance of the raw material. Thus, it is extremely challenging to learn a representation that encodes the information of editing components regardless of raw materials. Techniques for learning universal representations for diverse types of editing components are needed. Further, none of the existing datasets support research on learning universal representation for major types of video editing components. As such, a dataset that supports research on learning universal representation for the major types of video editing components is needed.

Described herein are techniques for learning universal representations for diverse types of editing components, as well as a large-scale video editing components dataset that may be used to facilitate research on editing components and automatic video editing. For example, the proposed dataset contains 618,800 videos covering 3,094 editing components from six major editing component types. Each video is rendered with one editing component with both image and video materials to enable atomic research on single editing components.

The techniques for learning universal representations for diverse types of editing components described herein may utilize a novel embedding guidance architecture that enhances the distinguishing ability of editing components by providing feedback from the output embedding to a machine learning model. For example, the embedding guidance architecture may be used to distinguish the editing components and raw materials; and a specifically designed contrastive learning loss may be utilized to guide the training process of the machine learning model. The learned representations of editing components can be directly applied to downstream tasks, such as transition recommendation, achieving state-of-the-art results. Attention map visualization shows that the model described herein learns to focus on the editing components without pixel-level supervision.

FIG. 1 shows an example system 100 for generating representations of editing components using a machine learning model. The machine learning model may be trained to distinguish editing components from raw materials. The machine learning model may be trained to generate the representations of the editing components. The machine learning model may comprise a first sub-model 101 and a second sub-model 103. The first sub-model 101 may receive, as input, images 102 and guidance tokens 104. The images 102 may comprise content of raw materials. At least one editing component may be applied on the raw materials. The guidance tokens 104 may be considered as feedback from learned embedding to the input. The guidance tokens 104 may provide prior knowledge of possible editing components. The first sub-model 101 may generate tokens 106 corresponding to the images 102. The first sub-model 101 may generate the tokens 106 corresponding to the images 102 based on the images 102 and the guidance tokens 104. The tokens 106 may be sent (e.g., by the first sub-model 101) to the second sub-model 103.

In embodiments, the first sub-model 101 comprises a spatial encoder. The spatial encoder may divide each input image 102 into patches. The spatial encoder may generate one or more patch embeddings. For example, the spatial encoder may comprise a linear projection layer. The linear projection layer may generate the patch embedding(s). Image tokens may be generated by adding one or more positional embedding to each patch embedding. The guidance tokens 104 may be input into the spatial encoder. A class token may be concatenated to the image tokens and the guidance token 104 to aggregate information. The class token may be indicative of at least some of the parameters of the machine learning model. Initially, the class token may be initialized with a Vision Transformer (ViT) and updated during training. The class token may be the same for different input image samples. A class token may be generated and output. The class token may correspond to each input image 102. The class token may be generated by a plurality of transformer layers with multi-head self-attention. In embodiments, the first sub-model 101 comprises a temporal encoder. The temporal encoder may learn a temporal correlation between the input images 102. The temporal encoder may comprise a plurality of self-attention transformer blocks.

The second sub-model 103 may receive, as input the tokens 106 corresponding to the images 102. The second sub-model 103 may receive, as input the guidance tokens 104. The second sub-model 103 may generate an embedding 108. The embedding 108 may be indicative of the at least one editing component. The second sub-model 103 may generate the embedding 108 based on the tokens 106 corresponding to the images and the guidance tokens 104. The second sub-model 103 may comprise a cross-attention mechanism.

In embodiments, the second sub-model 103 comprises at least a first transformer block and a second transformer block. The first and second transformer blocks may comprise a plurality of layers. The second sub-model 103 may generate the embedding 108 indicative of the at least one editing component by adopting the guidance tokens 104 as key-value tokens of the first transformer block of the second sub-model 103. The second sub-model 103 may extract prior knowledge of editing component embedding(s) by feeding a query token to the first transformer block. In examples, the query token may be initialized to all zeros. A token output from the first transformer block and the tokens 106 corresponding to the images output from the first sub-model 101 may be fed into the second transformer block of the second sub-model 103. The embedding 108 indicative of the at least one editing component may be generated by the plurality of layers of the first and second transformer blocks.

In embodiments, a dataset (e.g., a dataset of editing components) may be generated and used to train the machine learning model. The dataset of editing components may comprise different types of editing components. The different types of editing components may comprise, for example, video effect, animation, transition, filter, sticker, and/or text. Each video in the dataset may be rendered by applying each single editing component on both image materials and video materials. The dataset of editing components may enable the machine learning model to learn universal representations of different editing components. The dataset of editing components may facilitate downstream tasks, such as editing component recommendation, editing component detection, and visual effect generation. The machine learning model may be trained on at least a subset of the dataset of editing components. A process of training the machine learning model may be guided by a contrastive learning loss. The contrastive learning loss may be applied to pull positive samples closer while pushing negative samples away in embedding space.

Figure 2:
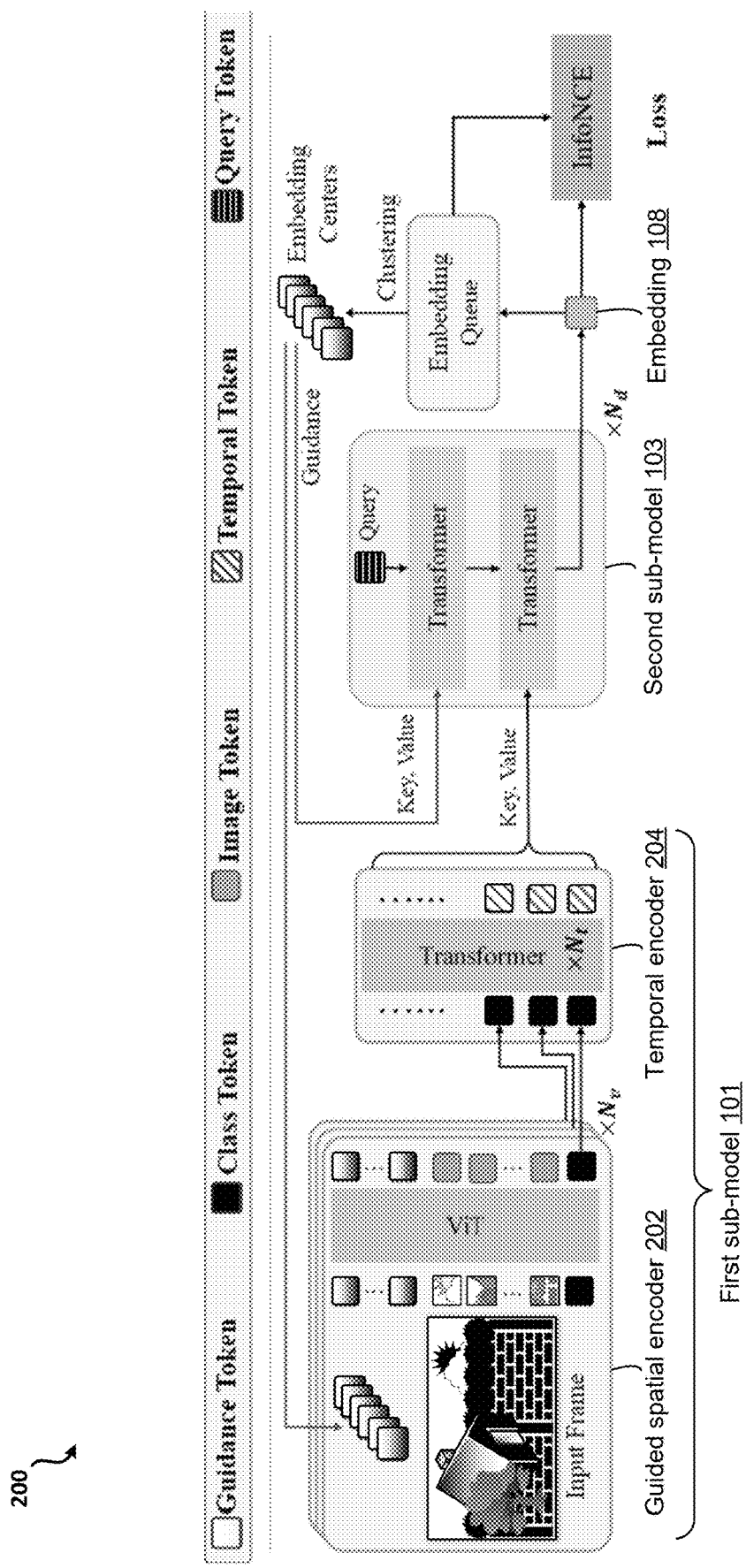
FIG. 2 shows an example system for generating representations of editing components using a machine learning model in accordance with the present disclosure.

FIG. 2 shows an example system 200 for generating representations of editing components using a machine learning model. The system 200 comprises the first sub-model 101 and the second sub-model 103 of the machine learning model. Given the input video frames $F=\{f_i\}_{i=1}^{N_v}$ where $f_i \in R^{H \times W \times C}$, where H, W, C denotes the height, width and channels, respectively, the goal the machine learning model of the system 200 is to generate an embedding that encodes the information of the editing component in the video for recognition, recommendation, etc. An ideal embedding should be dependent on the applied editing components but independent of the raw video materials. Visually similar editing components may be close to each other in the embedding space (e.g., all heart shaped video effects may be distributed in a cluster).

To achieve this goal, a special representation learning task may be formulated as a contrastive learning problem. Given a set of raw material videos $M=\{M_i\}_{i=1}^{N_m}$ and editing components $E=\{E_j\}_{j=1}^{N_e}$, each raw video may be rendered with all the $N_e$ editing components, resulting in $N_m \times N_e$ rendered videos $\{(m_i, e_j)\}$. For the editing component $e_k$, all of the rendered videos using this editing component $\{(m_i, e_k)\}$ are considered as positive samples for each other. On the other hand, all of the rendered videos with other editing components $\{(m_i, e_j)|j \neq k\}$ are considered negative samples for $e_k$. A contrastive loss may then be applied to pull the positive samples closer while pushing the negative samples away in the embedding space.

The first sub-model 101 may comprise a guided spatial-temporal encoder. The guided spatial-temporal encoder may comprise a guided spatial encoder 202. As shown in FIG. 2, the $N_v$ input frames are fed to the guided spatial encoder 202 separately. Each input frame may be evenly divided into small patches. The patches may have a size of 7×7. The patches may be fed to a linear projection layer to generate patch embeddings. A positional embedding may be added to each embedding to generate image tokens.

To help the machine learning model distinguish editing components and raw materials in the rendered frames, another set of guidance tokens may be added in the input. These guidance tokens may be considered as feedback from the learned embedding to the input. These guidance tokens may provide the spatial encoder with prior knowledge of possible editing components. The class token may be concatenated to the input tokens to aggregate the information from all the tokens. The tokens may be fed to multiple transformer layers with multi-head self-attention. The output class token of the last transformer layer may be used as the output of the whole frame.

The guided spatial-temporal encoder may comprise a temporal encoder 204. For $N_v$ input frames, $N_v$ output class tokens may be generated separately without temporal correlation. However, some editing components, e.g., animation, and transition, contain strong motion information which may require strong temporal information to be understood. The temporal encoder 204 may contain $N_t$ self-attention transformer blocks to learn the temporal correlation between frames. In addition, some editing components may be indistinguishable if the sequential information is missing. For example, "move to left transition" played in reverse order is the same as "move to right transition," so a position embedding may be added to the input tokens of the temporal encoder 204 to provide sequential information.

The second sub-model 103 may comprise a guided embedding decoder. The output tokens of the first sub-model 101 may contain the mixed information from the editing components and the raw materials. Cross attention may be leveraged to extract information corresponding to the editing components from the input tokens. As shown in FIG. 2, the guidance tokens may first be adopted as the (key, value) tokens of the cross-attention transformer block. The guidance tokens may represent the historical embedding of editing components. One query token is fed to the first transformer block to extract prior knowledge of the editing components embedding. The query token may be initialized to all zeros. The output token is then fed to the second transformer block as the query token and the output of the first sub-model 101 is used as (key, value) tokens. The second sub-model 103 may contains $N_d$ layers of these two transformer blocks, and the output token of the last layer may be used as the final embedding of the input video.

In embodiments, the limited batch size is not sufficient to provide enough hard negative samples for contrastive learning. This issue may be addressed with sample mining or a memory bank/queue. For the memory bank/queue, the dynamic embedding queues may be built to save the recently generated embedding corresponding to all editing components instead of the whole video set. For each specific editing component in the training set, a first-in-first-out (FIFO) queue with the size (e.g., length) of 5 may be maintained to save the most recently generated embedding corresponding to this editing component during training. For example, the embedding of sample i may be stored in the queue of the corresponding editing component, the queue may have a length of five. Therefore, any queue that contains the embeddings of the previous five samples from the corresponding editing component may be chosen. The memory cost of the embedding queues is negligible, but it provides a large number of negative samples for contrastive learning. All of the embeddings may be $l_2$-normalized before joining the queue.

The embedding queues may provide prior knowledge of all the editing components that can be used as guidance to improve the first sub-model 101 and the second sub-model 103 for distinguishing editing components from raw videos. However, using thousands of embeddings as guidance tokens may cost a lot in terms of GPU memory and computation. As such, the embedding centers may be adopted as the guidance tokens. As the six types of editing components are naturally clustered into six corresponding centers in the embedding space, the embedding centers may be directly computed for the six types as guidance tokens, which involves negligible memory and computation costs. For example, there may be 5 embeddings in each queue. The embeddings in each queue may be averaged and normalized. Each queue may be associated with normalized embeddings. These normalized embeddings may be used for clustering. Then, clustering may be performed for all of the queues (e.g., all editing components). In embodiments, at a training time t1, there may be n queues corresponding to the n editing components obtained before time t1. As training progresses, for example, at training time t2, the n queues may be updated based on the samples that appeared between t1 and t2.

During training of the machine learning model, embedding centers may be calculated from the embedding queues. The embedding centers calculated from the embedding queues may serve as guidance input to the spatial encoder and decoder during the training process. Contrastive loss may be used to update the model parameters during the training process. The embedding centers calculated from the embedding queues may be saved and used directly during testing and inference of the machine learning model. As such, contrastive loss and embedding queue may not be needed during testing or inference process. Alternatively, embedding centers calculated from embedding queues during inference process may be adopted as guidance input during the inference process.

In embodiments, the machine learning model is optimized with two loss terms, i.e., an in-batch loss and an embedding queue loss. First, $N_b$ editing components in a batch, i.e., $\{e_i\}_{i=1}^{N_b}$ may be sampled. For each editing component $e_i$, two positive samples may be randomly selected. Their embeddings may be denoted as $q_i$ and $k_i$. Other embeddings in this batch, e.g., $\{k_j\}_{j \neq i}$ may be negative samples for $q_i$ because they correspond to different editing components. The in-batch loss may be written as:

$$L_{batch} = \frac{1}{N_b} \sum_{i=1}^{N_b} -\log \frac{\exp(q_i \cdot k_i / \tau)}{\sum_{j=1}^{N_b} \exp(q_i \cdot k_j / \tau)}$$

where · means the cosine similarity operation between two embeddings and $\tau$ is the temperature. $N_e$ editing components in total may be used for the training. There may be $N_e$ embedding queues saving the most recent embeddings generated during training. The $l_2$-normalized average embedding in each queue may be used as the reference embedding, i.e., $\{r_j\}^{N_e}$. The embedding queue loss term is given as:

$$L_{queue} = \frac{1}{N_e} \sum_{i=1}^{N_e} -\log \frac{\exp(q_i \cdot r_i / \tau)}{\sum_{j=1}^{N_b} \exp(q_i \cdot r_j / \tau)}$$

This term covers other hard negative editing components for qj and improves both the performance and training stability. The final loss may be computed as $L = L_{batch} + L_{queue}$.

Video editing components can include one or more of the following: video effects, animation, transition, filters, stickers, and text. Both video effects and filters change the appearance of material images or video frames toward a specific style. Video effects focus more on local editing (e.g., adding shining star-shaped markers). Filters mainly change the overall style of the whole scene (e.g., adjusting the illumination and chroma). Animation can be considered as a homography transformation applied to the whole material, which is similar to camera viewpoint changes. Transition may be applied to connect two materials with appearance changes and fast motion. Sticker may use copy-paste to add another foreground object on top of the current material, which is similar to image compositing. Some of the stickers may be video stickers. The stickers may look different in each frame. Text is a special sticker whose content can be edited by the user, but the text style can be changed by applying different fonts or styles.

FIG. 3 shows example statistical information 300 for a dataset of editing components. Existing video datasets mostly focus on understanding the overall content of video frames (e.g., action, context, semantics, and geometry), which does not support research for understanding video editing components. For example, one existing dataset (e.g., AutoTransition) only contains one editing component type (i.e., 104 transitions) out of the major six types of editing components with limited coverage. The dataset used to train the machine learning model described herein is a largescale editing component dataset for video creation covering all of the six major types of editing components (e.g., video effect, animation, transition, filter, sticker, and text).

To generate the dataset, videos with different editing components may be generated. Images and videos from existing datasets may be used as raw materials for rendering. For each video, two images/videos may be randomly selected as the source material pair for two video slots, and each slot lasts two seconds. If the component is a transition, it may be added between the two slots, which lasts for two seconds, and each slot is reduced to one second. Otherwise, the component may be applied on both of the two slots, which covers four seconds. In total, 100 image pairs and 100 video pairs may be used to generate 618,800 videos covering 3,094 editing components.

Figure 4:
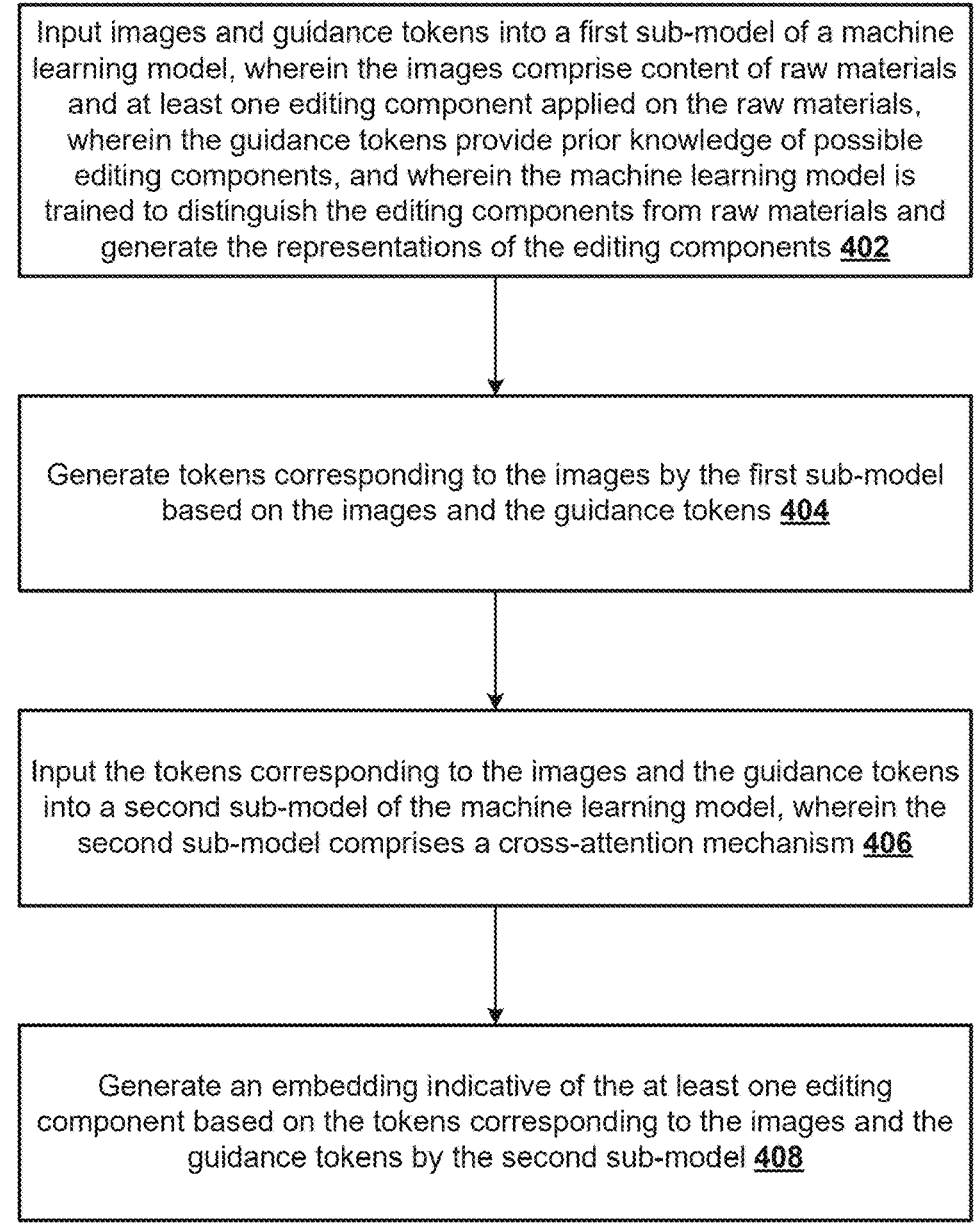
FIG. 4 shows an example process for generating representations of editing components using a machine learning model in accordance with the present disclosure.

FIG. 4 illustrates an example process 400 for generating representations of editing components using a machine learning model. Although depicted as a sequence of operations in FIG. 4, those of ordinary skill in the art will appreciate that various embodiments may add, remove, reorder, or modify the depicted operations.

A machine learning model may be trained to distinguish editing components from raw materials. The machine learning model may be trained to generate the representations of the editing components. The machine learning model may comprise a first sub-model (e.g., the first sub-model 101) and a second sub-model (e.g., the second sub-model 103). At 402, images and guidance tokens may be input into a first sub-model of a machine learning model. The images may comprise content of raw materials. At least one editing component may be applied on the raw materials. The guidance tokens may be considered as feedback from learned embedding to the input. The guidance tokens may provide prior knowledge of possible editing components. The first sub-model may generate tokens corresponding to the input images. At 404, tokens corresponding to the images may be generated by the first sub-model. The tokens may be generated based on the images and the guidance tokens. The tokens may be sent (e.g., by the first sub-model) to the second sub-model.

At 406, the tokens corresponding to the images may be input into the second sub-model. The guidance tokens may be input into the second sub-model. The second sub-model may comprise a cross-attention mechanism. The second sub-model may generate embedding(s) corresponding to editing component(s). At 408, an embedding indicative of the at least one editing component may be generated based on the tokens corresponding to the images and the guidance tokens by the second sub-model.

FIG. 5 illustrates an example process 500 for generating a dataset of editing components and training a machine learning model. Although depicted as a sequence of operations in FIG. 5, those of ordinary skill in the art will appreciate that various embodiments may add, remove, reorder, or modify the depicted operations.

At 502, a dataset of editing components may be generated. The dataset of editing components may comprise different types of editing components. The different types of editing components may comprise, for example, video effect, animation, transition, filter, sticker, and/or text. Each video in the dataset may be rendered by applying each single editing component on both image materials and video materials, and wherein the dataset of editing components enables to learn universal representations of different editing components. The dataset of editing components may enable a machine learning model to learn universal representations of different editing components. The dataset of editing components may facilitate downstream tasks, such as editing component recommendation, editing component detection, and visual effect generation.

At 504, a machine learning model may be trained on at least a subset of the dataset of editing components. The machine learning model may be trained to distinguish editing components from raw materials and generate representations of the editing components. At 506, a process of training the machine learning model may be guided by a contrastive learning loss. The process of training the machine learning model may be guided by the specifically designed contrastive learning loss. The contrastive learning loss may be applied to pull positive samples closer while pushing negative samples away in embedding space.

Figure 6:
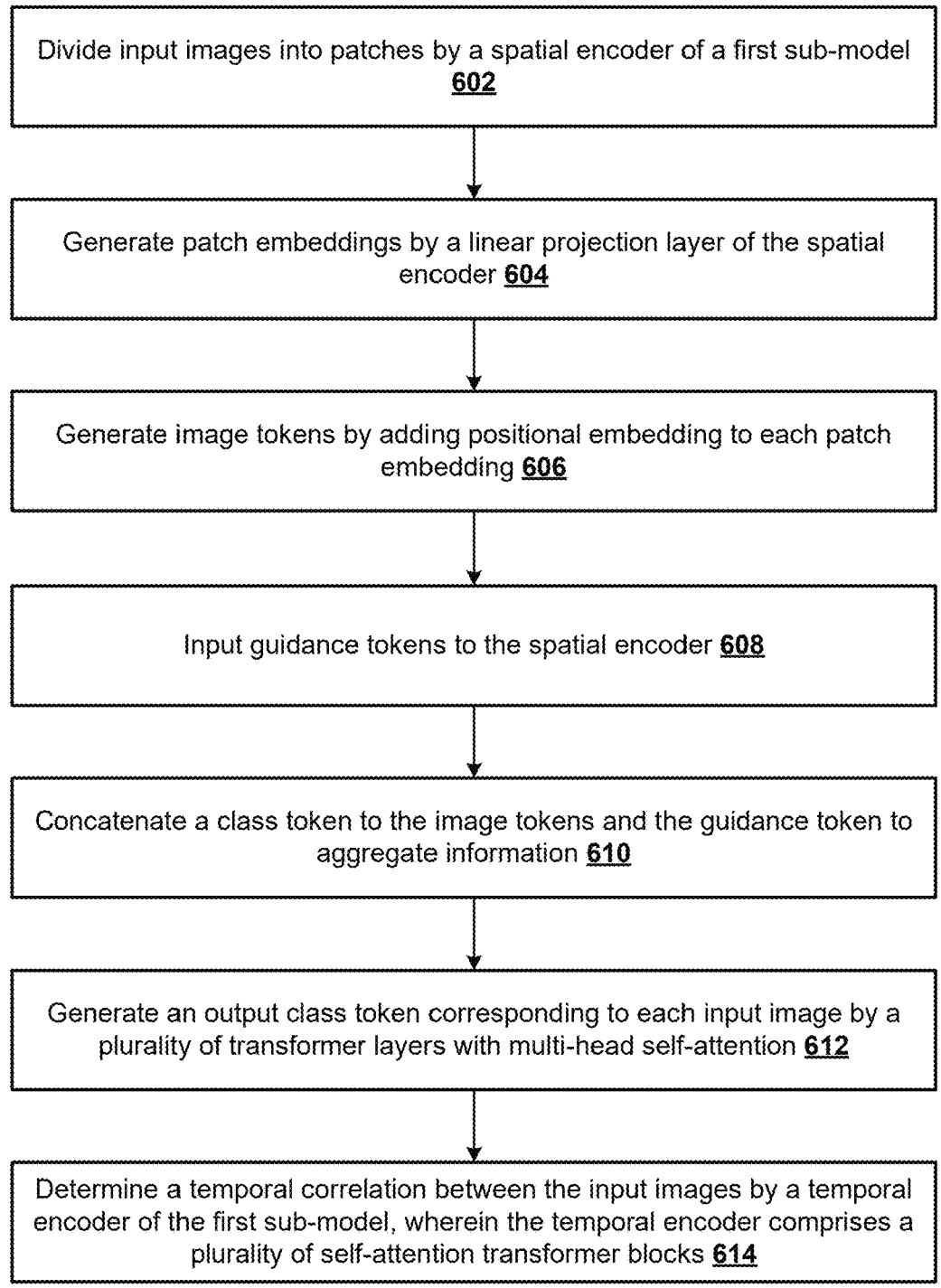
FIG. 6 shows an example process performed by a first sub-model of a machine learning model in accordance with the present disclosure.

FIG. 6 illustrates an example process 600 performed by a first sub-model of a machine learning model. Although depicted as a sequence of operations in FIG. 6, those of ordinary skill in the art will appreciate that various embodiments may add, remove, reorder, or modify the depicted operations.

A machine learning model may be trained to distinguish editing components from raw materials. The machine learning model may be trained to generate the representations of the editing components. The machine learning model may comprise a first sub-model model (e.g., the first sub-model 101) and a second sub-model (e.g., the second sub-model 103). The first sub-model of a machine learning model may comprise a spatial encoder. At 602, each input image may be divided into patches. Each input image may be divided into patches by the spatial encoder. At 604, patch embeddings may be generated. The patch embeddings may be generated by a linear projection layer of the spatial encoder. At 606, image tokens may be generated. The image tokens may be generated by adding positional embedding to each patch embedding. At 608, guidance tokens may be input into the spatial encoder. The guidance tokens may be considered as feedback from the learned embedding to the input. The guidance tokens may provide the spatial encoder with prior knowledge of possible editing components.

At 610, a class token may be concatenated to the image tokens and the guidance token to aggregate information. The tokens may be fed to a plurality of transformer layers with multi-head self-attention. At 612, a class token may be generated and output. The output class token may correspond to each input image. The class token may be generated by the plurality of transformer layers with multi-head self-attention. The output class token of the last transformer layer may be used as the output of each whole image. In embodiments, the first sub-model comprises a temporal encoder. At 614, a temporal correlation between the input images may be determined or learned. The temporal correlation may be determined or learned by the temporal encoder of the first sub-model. The temporal encoder may comprise a plurality of self-attention transformer blocks to learn the temporal correlation between the input images.

FIG. 7 illustrates an example process 700 performed by a second sub-model of a machine learning model. Although depicted as a sequence of operations in FIG. 7, those of ordinary skill in the art will appreciate that various embodiments may add, remove, reorder, or modify the depicted operations.

A machine learning model may be trained to distinguish editing components from raw materials. The machine learning model may be trained to generate the representations of the editing components. The machine learning model may comprise a first sub-model (e.g., the first sub-model 101) and a second sub-model (e.g., the second sub-model 103). The second sub-model may comprise a cross-attention mechanism. The output tokens of the first sub-model may contain the mixed information from the editing components and the raw materials. Cross attention may be leveraged to extract information corresponding to the editing components from the input tokens. The second sub-model may comprise a first transformer block and a second transformer block. The first and second transformer blocks may comprise a plurality of layers. The second sub-model may generate an embedding indicative of the at least one editing component by adopting guidance tokens as key-value tokens of the first transformer block of the second sub-model. At 702, guidance tokens may be adopted as key-value tokens of a first transformer block of a second sub-model.

The second sub-model may extract prior knowledge of editing component embedding(s). At 704, prior knowledge of editing component embedding may be extracted. The prior knowledge of editing component embedding may be extracted by feeding a query token to the first transformer block. A token output from the first transformer block and the tokens corresponding to the images output from the first sub-model may be fed into the second transformer block of the second sub-model. At 706, a token output from the first transformer block and tokens corresponding to the images output from a first sub-model may be fed into a second transformer block of the second sub-model. At 708, an embedding indicative of at least one editing component may be generated. The embedding indicative of at least one editing component may be generated by the plurality of layers of the first and second transformer blocks.

Figure 8:
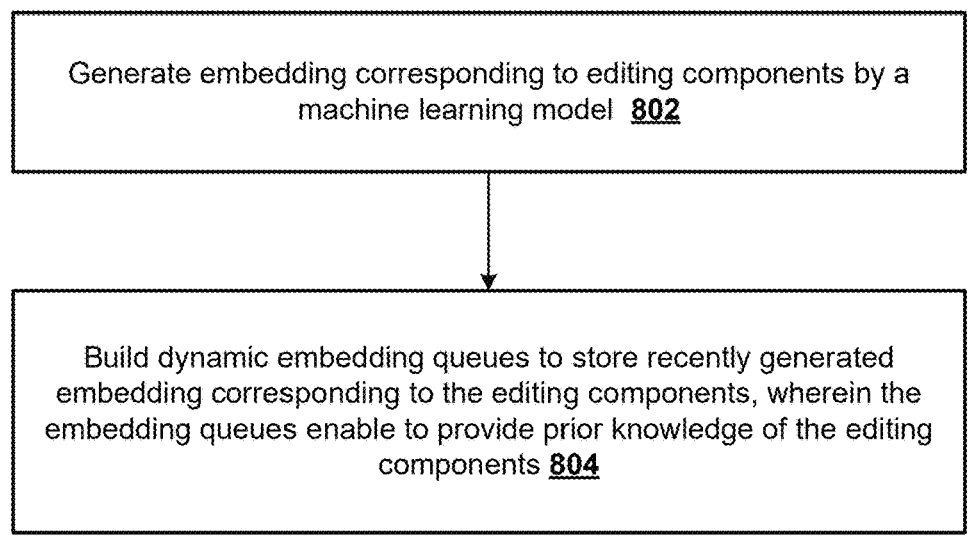
FIG. 8 shows an example process for building dynamic embedding queues to store recently generated embedding in accordance with the present disclosure.

FIG. 8 illustrates an example process 800 for building dynamic embedding queues to store recently generated embedding. Although depicted as a sequence of operations in FIG. 8, those of ordinary skill in the art will appreciate that various embodiments may add, remove, reorder, or modify the depicted operations.

Tokens corresponding to the images and guidance tokens may be input into a second sub-model of a machine learning model. The second sub-model (e.g., the second sub-model 103) may generate embeddings corresponding to editing component(s). At 802, embeddings corresponding to editing components may be generated. The embeddings corresponding to editing components may be generated by a machine learning model. The embedding corresponding to editing components may be generated based on tokens corresponding to the input images and guidance tokens by the second sub-model of a machine learning model.

A limited batch size may not be sufficient to provide enough hard negative samples for contrastive learning. This issue may be addressed with sample mining or a memory bank/queue. For the memory bank/queue, the dynamic embedding queues may be built to save the recently generated embedding corresponding to all editing components instead of the whole video set. At 804, dynamic embedding queues may be built to store recently generated embedding corresponding to the editing components. The embedding queues may enable to provide prior knowledge of the editing components. For each specific editing component in a training set, a first-in-first-out (FIFO) queue with the size of 5 may be maintained to save the most recently generated embedding corresponding to this editing component during training. The memory cost of the embedding queues is negligible, but it provides a large number of negative samples for contrastive learning. All of the embeddings may be $l_2$-normalized before joining the queue.

Figure 9:
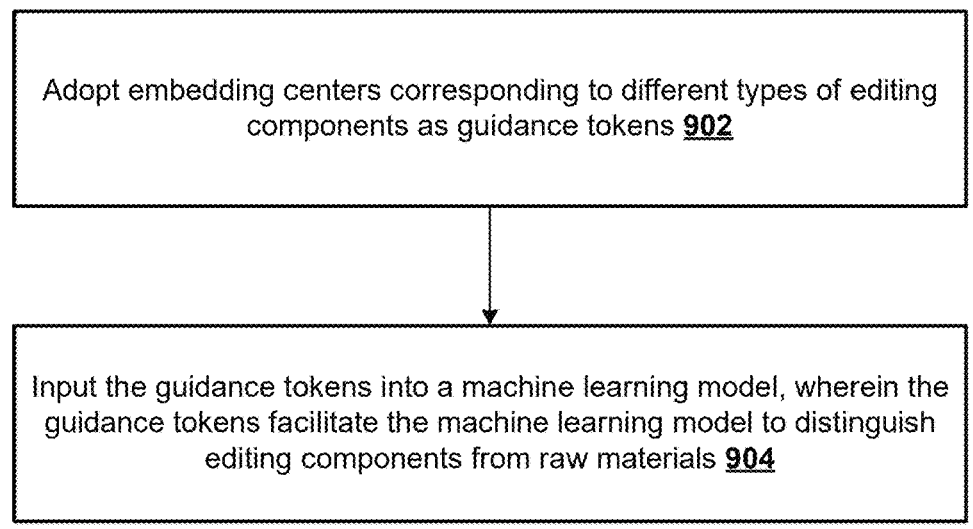
FIG. 9 shows an example process for adopting embedding centers as guidance tokens for inputting to a machine learning model in accordance with the present disclosure.

FIG. 9 illustrates an example process 900 for adopting embedding centers as guidance tokens for inputting to a machine learning model. Although depicted as a sequence of operations in FIG. 9, those of ordinary skill in the art will appreciate that various embodiments may add, remove, reorder, or modify the depicted operations.

A limited batch size may not be sufficient to provide enough hard negative samples for contrastive learning. This issue may be addressed with sample mining or a memory bank/queue. For the memory bank/queue, the dynamic embedding queues may be built to save the recently generated embedding corresponding to all editing components instead of the whole video set. For each specific editing component in the training set, a first-in-first-out (FIFO) queue with the size of 5 may be maintained to save the most recently generated embedding corresponding to this editing component during training. The memory cost of the embedding queues is negligible, but it provides a large number of negative samples for contrastive learning. All of the embeddings may be $l_2$-normalized before joining the queue.

The embedding queues may provide prior knowledge of all the editing components that can be used as guidance to improve the first sub-model and the second sub-model for distinguishing editing components from raw videos. However, using thousands of embedding as guidance tokens may cost a lot in terms of GPU memory and computation. As such, the embedding centers may be adopted as the guidance tokens. At 902, embedding centers corresponding to different types of editing components may be adopted as guidance tokens. As the six types of editing components are naturally clustered into six corresponding centers in the embedding space, the embedding centers may be directly computed for the six types as guidance tokens, which involves negligible memory and computation costs. At 904, the guidance tokens may be input into a machine learning model. The guidance tokens may facilitate the machine learning model to distinguish editing components from raw materials.

FIG. 10 shows a table 1000 illustrating a comparison between the dataset described herein ("Ours") with major existing video datasets. The dataset described herein contains significantly (29.75×) more editing components than the existing AutoTransition dataset. Unlike the existing AutoTransition dataset, which adopts online published videos with unbalanced distribution, the dataset described herein is more balanced across different editing components which is critical for representation learning. The dataset described herein provides editing components with static image materials, which provides valuable research source data for understanding the motion effect of editing components. The dataset described herein is also comparable to major action recognition datasets in terms of number of videos and total duration. The dataset described herein can be used for self-supervised pre-training or generalization evaluation of foundation models.

The performance of the machine learning model described herein was evaluated. To evaluate the performance, experiments were conducted using two datasets (e.g., the dataset described herein ("Edit3K") and AutoTransition) for editing components. For editing components retrieval, one video rendered with a certain editing component and one pair of raw materials were randomly selected as the query. Then a set of videos rendered with another pair of materials and all editing components in the evaluation set were randomly selected as the reference set. If the retrieved video uses the same editing component as the query video, this query is considered correct. The average Recall at k (denoted as R@k) was evaluated for all queries.

PyTorch was used to implement the methods described herein. CLIP-B/32 pre-trained weights were used to initialize the spatial encoder and the remaining modules were all randomly initialized. BERT was followed to implement the self-attention and cross-attention transformer block. For input videos, $N_v$=16 frames were uniformly sampled from each video, and the height H and width W of each frame was resized to 224×224. The machine learning model was trained with Adam optimizer and cosine learning rate scheduling. The batch size $N_b$ per GPU was set to 8 by default, and all models were trained for 20 epochs. It took 16.7 hours to train the machine learning model described herein on 8 Nvidia A100 GPUs. The learning rate of the spatial encoder was set to 1e-6, and 1e-5 was used for the rest of the model. The number of layers in the temporal encoder and embedding decoder, i.e., $N_t$, $N_d$, are both set to two. For both the encoder and decoder, the number of attention heads was set to 8 and the hidden dimension was 512. The total number of raw material videos and editing components, i.e., $N_m$, $N_e$, were 200 and 3094, respectively. The temperature parameter T was set to 0.7.

The performance of the techniques described herein was compared with state-of-the-art video representation learning methods, including self-supervised and supervised representation learning methods. For self-supervised representation learning, recent works fall into two categories, i.e., contrastive learning and masked autoencoder. Two best performing methods were selected for comparison, i.e., VideoMoco and VideoMAE. VideoMoco and Video-MAE were retrained on the Edit3K dataset with their official code. Early works simply use supervised classification for video representation learning and the method described herein was compared with classification on both closed-set and open-set settings. The classification method was implemented by replacing the InfoNCE loss with cross-entropy loss on 3,094 editing component classes. The output feature of the layer before classification was used as the embedding for retrieval.

FIG. 11 shows a table 1100 illustrating the detailed performance of six types of editing components, as well as the average accuracy. As shown in the table 1100, the method described herein significantly outperforms existing self-supervised representation learning methods, because existing methods are trained to encode the overall content information in video frames where raw materials and editing components are visually mixed. The average accuracy R@1 of the method described herein (e.g., "Ours") is much higher (+21.4%) than that of the method described herein with no guidance and embedding queue (e.g., "Ours (Baseline)"), indicating the importance of guidance information on distinguishing raw material and editing components. The improvement is also consistent for all six types of editing components. As shown in the table 1200 of FIG. 12, the method described herein also significantly outperforms classification, especially (+23.98%) on open-set setting. The results indicate that the proposed contrastive loss has better generalization ability on unseen editing components than classification loss.

The learned universal representation was evaluated on a major downstream task, i.e., transition recommendation, to validate the generalization ability of the proposed dataset and method. Since the transitions in the AutoTransition dataset are included in the Edit3K dataset, the embedding computed on Edit3K can be directly adopted to AutoTransition dataset. The transition recommendation pipeline in AutoTransition takes the pre-trained embedding of all transitions as part of the inputs and the model learns to recommend transitions based on input video frames and audio. The same training and evaluation pipeline as that of AutoTransition was used, and the performance of different representation learning methods was compared by simply changing the pre-trained embedding.

Ablation studies were conducted by removing different modules to demonstrate the effectiveness of each module. The results of the ablation studies are shown in Table 1300 of FIG. 13. "Baseline" denotes the model with only spatial-temporal encode and in-batch InfoNCE loss. "Baseline+$L_{queue}$" means adding the embedding queue loss term, and R@1 is improved by 5.4%, indicating the effectiveness of the dynamic embedding loss term. "Baseline+$L_{queue}$+Guided Encoder" denotes adding guidance tokens in the spatial encoder of "Baseline+$L_{queue}$". "Baseline+$L_{queue}$+Guided Decoder" means adding the guided embedding decoder on the "Baseline+$L_{queue}$" model. "Baseline+$L_{queue}$+GE+GD" is the final model with all modules as shown in FIG. 2. The guidance for the encoder and decoder improves the R@1 by 3.4% and 12.4% respectively compared to "Baseline+$L_{queue}$". The performance is further improved when adding guidance in both the encoder and decoder, demonstrating the effectiveness of the guidance architecture.

The final model only uses the rendered video as input so that it can be directly adopted to recognize unseen editing components. However, if the objective is to learn good embedding space for closed-set settings, it might be better to add the raw video as part of the input, because the model can directly compare the rendered and raw video to determine the editing components applied in the rendered video. To verify this point, experiments were conducted by adding raw video frames along with the original input of the model. The results are shown in Table 1400 of FIG. 14A. This strategy would inevitably cost extra computation and GPU memory (+30%) and the batch size has to be reduced from 8 to 6 to fit in the GPU memory. As shown in the table 1400 of FIG. 14A, the performance slightly degrades when the batch size (denoted as BS) per GPU is reduced but adding raw video does not have much benefit on R@1. On the other hand, the model without raw video can use a larger batch size and the performance is better than adding raw video in terms of both R@1 and R@10. Therefore, raw video is not added in the inputs by default due to its high computational cost and limited performance improvement.

To directly evaluate the embedding space for all the editing components, a user study was conducted, where the users determined whether the clustered editing components were visually similar to each other. The open-set setting of Edit3K was used and the embedding for 1, 547 editing components was computed. The embedding of each editing component was computed as the center of all video embedding corresponding to this specific editing component. 27 editing components were randomly selected from each of the 6 major types as queries. Then, each query performed a search among the embedding of all the editing components except the query itself. The top-1 retrieved result was used for the user study, resulting in 162 query-result pairs. The process was followed to generate results for 4 methods, i.e., "Ours", "Ours (Base-line)", "Classification", and "Random." In total, 648 query-result pairs were used for evaluation. The users were given 5 videos in a row, where the left column is the video for the query editing component, and the other columns show the example videos for the retrieved editing components corresponding to the 4 methods (example included in supplementary material). The users were asked to select the videos that were visually similar to the query and each query was evaluated by at least 10 users.

As shown in table 1401 of FIG. 14B, "Ours" significantly outperforms the other three methods in terms of average satisfactory rate, indicating the effectiveness of the proposed guidance architecture and additional loss on embedding distribution. The result is also consistent across different editing component categories. The table 1403 of FIG. 14C shows that the embedding of the method described herein outperforms AutoTransition in terms of both R@k and mean rank by only changing the pre-trained embedding. The results indicate that the universal representation learned on Edit3K can generalize well on unseen data and the proposed Edit3K dataset could serve as a good representation pre-training set for all editing components downstream tasks, e.g., recommendation, detection, etc.

Figure 15:
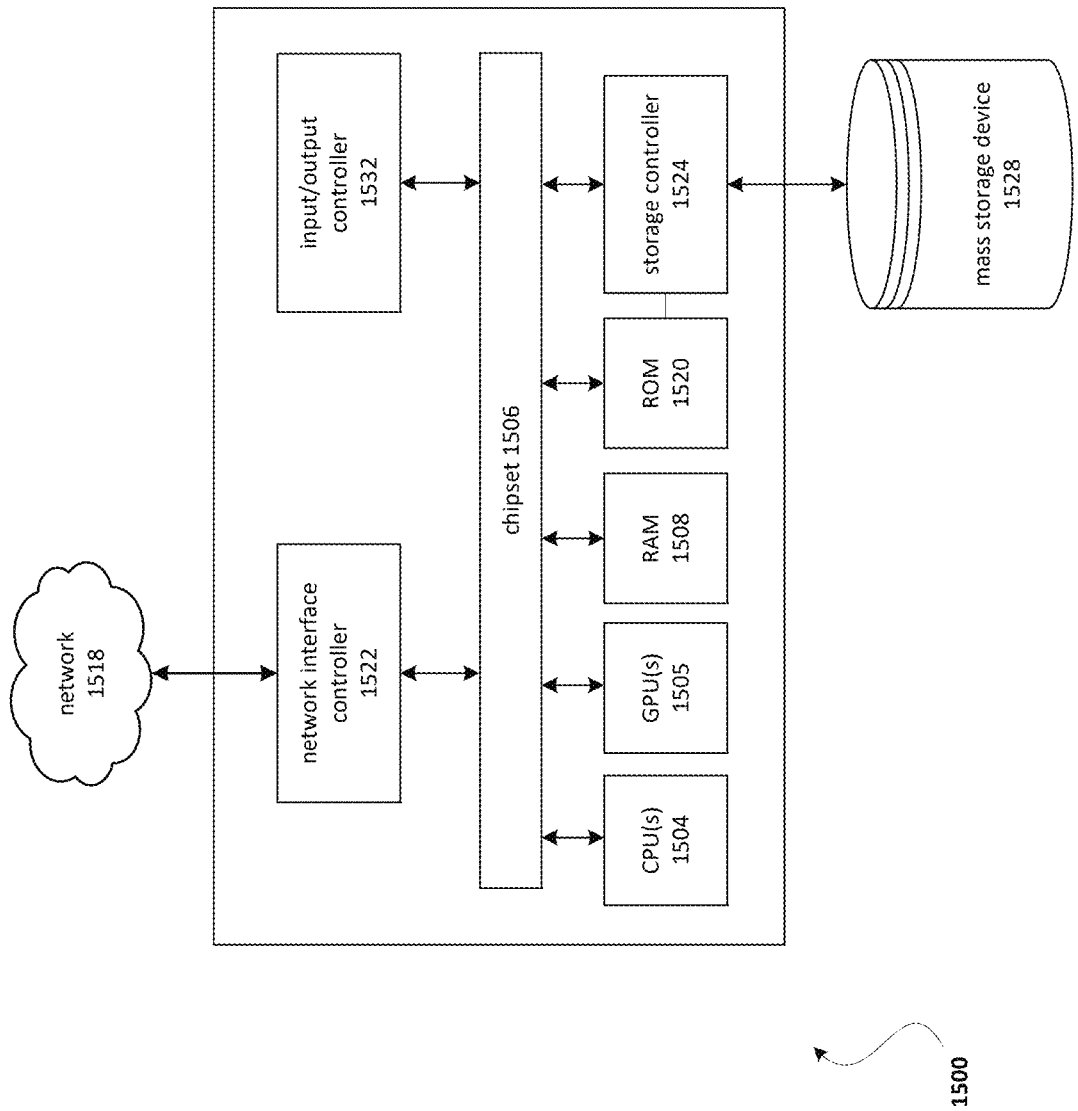
FIG. 15 shows an example computing device which may be used to perform any of the techniques disclosed herein.

FIG. 15 illustrates a computing device that may be used in various aspects, such as the services, networks, sub-models, and/or devices depicted in FIG. 1. With regard to FIG. 1, any or all of the components may each be implemented by one or more instance of a computing device 1500 of FIG. 15. The computer architecture shown in FIG. 15 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 1500 may include a baseboard, or "motherboard," which is a printed circuit board to which a multitude of components or devices may be connected by way of a system bus or other electrical communication paths. One or more central processing units (CPUs) 1504 may operate in conjunction with a chipset 1506. The CPU(s) 1504 may be standard programmable processors that perform arithmetic and logical operations necessary for the operation of the computing device 1500.

The CPU(s) 1504 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1504 may be augmented with or replaced by other processing units, such as GPU(s) 1505. The GPU(s) 1505 may comprise processing units specialized for but not necessarily limited to highly parallel computations, such as graphics and other visualization-related processing.

A chipset 1506 may provide an interface between the CPU(s) 1504 and the remainder of the components and devices on the baseboard. The chipset 1506 may provide an interface to a random-access memory (RAM) 1508 used as the main memory in the computing device 1500. The chipset 1506 may further provide an interface to a computer-readable storage medium, such as a read-only memory (ROM) 1520 or non-volatile RAM (NVRAM) (not shown), for storing basic routines that may help to start up the computing device 1500 and to transfer information between the various components and devices. ROM 1520 or NVRAM may also store other software components necessary for the operation of the computing device 1500 in accordance with the aspects described herein.

The computing device 1500 may operate in a networked environment using logical connections to remote computing nodes and computer systems through local area network (LAN). The chipset 1506 may include functionality for providing network connectivity through a network interface controller (NIC) 1522, such as a gigabit Ethernet adapter. A NIC 1522 may be capable of connecting the computing device 1500 to other computing nodes over a network 1516. It should be appreciated that multiple NICs 1522 may be present in the computing device 1500, connecting the computing device to other types of networks and remote computer systems.

The computing device 1500 may be connected to a mass storage device 1528 that provides non-volatile storage for the computer. The mass storage device 1528 may store system programs, application programs, other program modules, and data, which have been described in greater detail herein. The mass storage device 1528 may be connected to the computing device 1500 through a storage controller 1524 connected to the chipset 1506. The mass storage device 1528 may consist of one or more physical storage units. The mass storage device 1528 may comprise a management component 1510. A storage controller 1524 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1500 may store data on the mass storage device 1528 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 1528 is characterized as primary or secondary storage and the like.

For example, the computing device 1500 may store information to the mass storage device 1528 by issuing instructions through a storage controller 1524 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1500 may further read information from the mass storage device 1528 by detecting the physical states or characteristics of one or more particular locations within the physical storage units.

In addition to the mass storage device 1528 described above, the computing device 1500 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1500.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1528 depicted in FIG. 15, may store an operating system utilized to control the operation of the computing device 1500. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 1528 may store other system or application programs and data utilized by the computing device 1500.

The mass storage device 1528 or other computer-readable storage media may also be encoded with computer-executable instructions, which, when loaded into the computing device 1500, transforms the computing device from a general-purpose computing system into a special-purpose computer capable of implementing the aspects described herein. These computer-executable instructions transform the computing device 1500 by specifying how the CPU(s) 1504 transition between states, as described above. The computing device 1500 may have access to computer-readable storage media storing computer-executable instructions, which, when executed by the computing device 1500, may perform the methods described herein.

A computing device, such as the computing device 1500 depicted in FIG. 15, may also include an input/output controller 1532 for receiving and processing input from a number of input devices, such as a keyboard, a mouse, a touchpad, a touch screen, an electronic stylus, or other type of input device. Similarly, an input/output controller 1532 may provide output to a display, such as a computer monitor, a flat-panel display, a digital projector, a printer, a plotter, or other type of output device. It will be appreciated that the computing device 1500 may not include all of the components shown in FIG. 15, may include other components that are not explicitly shown in FIG. 15, or may utilize an architecture completely different than that shown in FIG. 15.

As described herein, a computing device may be a physical computing device, such as the computing device 1500 of FIG. 15. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses, and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method of generating representations of editing components using a machine learning model, comprising:
   inputting images and guidance tokens into a first sub-model of the machine learning model, wherein the images comprise content of raw materials and at least one editing component applied on the raw materials, wherein the guidance tokens provide prior knowledge of possible editing components, and wherein the machine learning model is trained to distinguish the editing components from raw materials and generate the representations of the editing components;
   generating tokens corresponding to the images by the first sub-model based on the images and the guidance tokens;
   inputting the tokens corresponding to the images and the guidance tokens into a second sub-model of the machine learning model, wherein the second sub-model comprises a cross-attention mechanism; and
   generating an embedding indicative of the at least one editing component based on the tokens corresponding to the images and the guidance tokens by the second sub-model.

2. The method of claim 1, further comprising:
   generating a dataset of editing components, wherein each video in the dataset is rendered by applying each single editing component on both image materials and video materials, wherein the dataset of editing components enables to learn universal representations of different editing components.

3. The method of claim 2, wherein the machine learning model is trained on at least a subset of the dataset of editing components.

4. The method of claim 3, further comprising:
   guiding a process of training the machine learning model by a contrastive learning loss, wherein the contrastive learning loss is applied to pull positive samples closer while pushing negative samples away in embedding space.

5. The method of claim 2, wherein the dataset of editing components comprises different types of editing components, and wherein the different types of editing components comprise video effect, animation, transition, filter, sticker, and text.

6. The method of claim 1, wherein the first sub-model comprises a spatial encoder, and wherein the method further comprises:
dividing each input image into patches by the spatial encoder;
generating patch embedding by a linear projection layer of the spatial encoder;
generating image tokens by adding positional embedding to each patch embedding inputting the guidance tokens to the spatial encoder;
concatenating a class token to the image tokens and the guidance token to aggregate information; and
generating an output class token corresponding to each input image by a plurality of transformer layers with multi-head self-attention.

7. The method of claim 6, wherein the first sub-model further comprises a temporal encoder, and wherein the method further comprises:
determining a temporal correlation between the input images by the temporal encoder, wherein the temporal encoder comprises a plurality of self-attention transformer blocks.

8. The method of claim 1, wherein the generating an embedding indicative of the at least one editing component based on the tokens corresponding to the images and the guidance tokens by the second sub-model further comprising:
adopting the guidance tokens as key-value tokens of a first transformer block of the second sub-model;
extracting prior knowledge of editing component embedding by feeding a query token to the first transformer block;
feeding a token output from the first transformer block and the tokens corresponding to the images output from the first sub-model into a second transformer block, wherein the second sub-model comprises a plurality of layers of the first and second transformer blocks; and
generating the embedding indicative of the at least one editing component by the plurality of layers of the first and second transformer blocks.

9. The method of claim 1, further comprising:
building dynamic embedding queues to store recently generated embedding corresponding to the editing components, wherein the embedding queues enable to provide prior knowledge of the editing components.

10. The method of claim 1, further comprising:
adopting embedding centers corresponding to different types of editing components as the guidance tokens.

11. A system of generating representations of editing components using a machine learning model, comprising:
at least one processor; and
at least one memory communicatively coupled to the at least one processor and comprising computer-readable instructions that upon execution by the at least one processor cause the at least one processor to perform operations comprising:
inputting images and guidance tokens into a first sub-model of the machine learning model, wherein the images comprise content of raw materials and at least one editing component applied on the raw materials, wherein the guidance tokens provide prior knowledge of possible editing components, and wherein the machine learning model is trained to distinguish the editing components from raw materials and generate the representations of the editing components;
generating tokens corresponding to the images by the first sub-model based on the images and the guidance tokens;
inputting the tokens corresponding to the images and the guidance tokens into a second sub-model of the machine learning model, wherein the second sub-model comprises a cross-attention mechanism; and
generating an embedding indicative of the at least one editing component based on the tokens corresponding to the images and the guidance tokens by the second sub-model.

12. The system of claim 11, the operations further comprising:
generating a dataset of editing components, wherein each video in the dataset is rendered by applying each single editing component on both image materials and video materials, wherein the dataset of editing components enables to learn universal representations of different editing components.

13. The system of claim 12, wherein the machine learning model is trained on at least a subset of the dataset of editing components, and wherein the operations further comprise:
guiding a process of training the machine learning model by a contrastive learning loss, wherein the contrastive learning loss is applied to pull positive samples closer while pushing negative samples away in embedding space.

14. The system of claim 11, wherein the first sub-model comprises a spatial encoder and a temporal encoder, and wherein the operations further comprise:
dividing each input image into patches by the spatial encoder;
generating patch embedding by a linear projection layer of the spatial encoder;
generating image tokens by adding positional embedding to each patch embedding inputting the guidance tokens to the spatial encoder;
concatenating a class token to the image tokens and the guidance token to aggregate information;
generating an output class token corresponding to each input image by a plurality of transformer layers with multi-head self-attention; and
determining a temporal correlation between the input images by the temporal encoder, wherein the temporal encoder comprises a plurality of self-attention transformer blocks.

15. The system of claim 11, wherein the generating an embedding indicative of the at least one editing component based on the tokens corresponding to the images and the guidance tokens by the second sub-model further comprising:
adopting the guidance tokens as key-value tokens of a first transformer block of the second sub-model;
extracting prior knowledge of editing component embedding by feeding a query token to the first transformer block;
feeding a token output from the first transformer block and the tokens corresponding to the images output from the first sub-model into a second transformer block, wherein the second sub-model comprises a plurality of layers of the first and second transformer blocks; and generating the embedding indicative of the at least one editing component by the plurality of layers of the first and second transformer blocks.

16. The system of claim 11, the operations further comprising:
building dynamic embedding queues to store recently generated embedding corresponding to the editing components, wherein the embedding queues enable to provide prior knowledge of the editing components.

17. A non-transitory computer-readable storage medium, storing computer-readable instructions that upon execution by a processor cause the processor to implement operations comprising:
inputting images and guidance tokens into a first sub-model of the machine learning model, wherein the images comprise content of raw materials and at least one editing component applied on the raw materials, wherein the guidance tokens provide prior knowledge of possible editing components, and wherein the machine learning model is trained to distinguish the editing components from raw materials and generate the representations of the editing components;
generating tokens corresponding to the images by the first sub-model based on the images and the guidance tokens;
inputting the tokens corresponding to the images and the guidance tokens into a second sub-model of the machine learning model, wherein the second sub-model comprises a cross-attention mechanism; and
generating an embedding indicative of the at least one editing component based on the tokens corresponding to the images and the guidance tokens by the second sub-model.

18. The non-transitory computer-readable storage medium of claim 17, the operations further comprising:
generating a dataset of editing components, wherein each video in the dataset is rendered by applying each single editing component on both image materials and video materials, wherein the dataset of editing components enables to learn universal representations of different editing components.

19. The non-transitory computer-readable storage medium of claim 18, wherein the machine learning model is trained on at least a subset of the dataset of editing components, and wherein the operations further comprising:
guiding a process of training the machine learning model by a contrastive learning loss, wherein the contrastive learning loss is applied to pull positive samples closer while pushing negative samples away in embedding space.

20. The non-transitory computer-readable storage medium of claim 17, the operations further comprising:
adopting embedding centers corresponding to different types of editing components as the guidance tokens.

* * * * *